United States Patent [19]

Fukuda

[11] Patent Number: 4,993,256
[45] Date of Patent: Feb. 19, 1991

[54] LEAKAGE TEST METHOD AND APPARATUS

[75] Inventor: Akira Fukuda, Tokyo, Japan

[73] Assignee: Kabushiki Kaisha Fukuda, Tokyo, Japan

[21] Appl. No.: 340,469

[22] Filed: Apr. 19, 1989

[30] Foreign Application Priority Data

Apr. 20, 1988 [JP] Japan .................. 63-95702
Apr. 28, 1988 [JP] Japan .................. 63-104307

[51] Int. Cl.⁵ .................................. G01M 3/32
[52] U.S. Cl. .............................. 73/49.2; 340/605
[58] Field of Search ............ 73/40, 49.2, 49.3; 364/507, 558; 340/605

[56] References Cited

U.S. PATENT DOCUMENTS

| 3,028,750 | 4/1962 | Rondeau | 73/49.2 |
| 3,504,528 | 4/1970 | Weinberg et al. | 73/49.3 |
| 3,546,923 | 12/1970 | Fletcher et al. | 73/40 |
| 3,839,900 | 10/1974 | Fukuda | 73/49.3 |
| 3,931,731 | 1/1976 | Fukuda | 73/49.2 |
| 4,078,421 | 3/1978 | Gastaldo et al. | 73/49.2 |
| 4,126,034 | 11/1978 | Conrad | 73/49.2 |
| 4,670,847 | 6/1978 | Furuse | 73/49.2 |

FOREIGN PATENT DOCUMENTS

| 2238392 | 2/1973 | Fed. Rep. of Germany | 73/49.2 |
| 49-66486 | 5/1974 | Japan . | |
| 49-60586 | 6/1974 | Japan . | |
| 49-60978 | 6/1974 | Japan . | |
| 51-483854 | 4/1976 | Japan . | |
| 51-497744 | 4/1976 | Japan . | |
| 54-99686 | 7/1979 | Japan . | |
| 103341 | 8/1981 | Japan | 73/40 |
| 99831 | 5/1986 | Japan | 73/40 |
| 099832 | 5/1986 | Japan | 73/40 |
| 8101333 | 5/1981 | World Int. Prop. O. | 73/49.2 |

Primary Examiner—Hezron E. Williams
Attorney, Agent, or Firm—Fish & Richardson

[57] ABSTRACT

In order to accurately conduct a leakage test in a short time, an initial pressure higher than a test pressure is first supplied into a hollow object to be tested. Then, part of the pressure within the object is relieved to decrease the temperature within the object to the ambient temperature so that the pressure within the object can be stabilized at the test pressure. Then, a variation in the pressure within the object is detected to determine whether there is any leakage in the object. In the case where a negative pressure is utilized, an initial pressure lower than the test pressure is first supplied into the object, and then part of the pressure within the object is relieved by introducing the ambient air into the object, to increase the temperature within the object to the ambient temperature so that the pressure within the object can be stabilized at the test pressure. Then, a variation in the pressure within the object is detected to determine whether there is any leakage in the object.

7 Claims, 7 Drawing Sheets

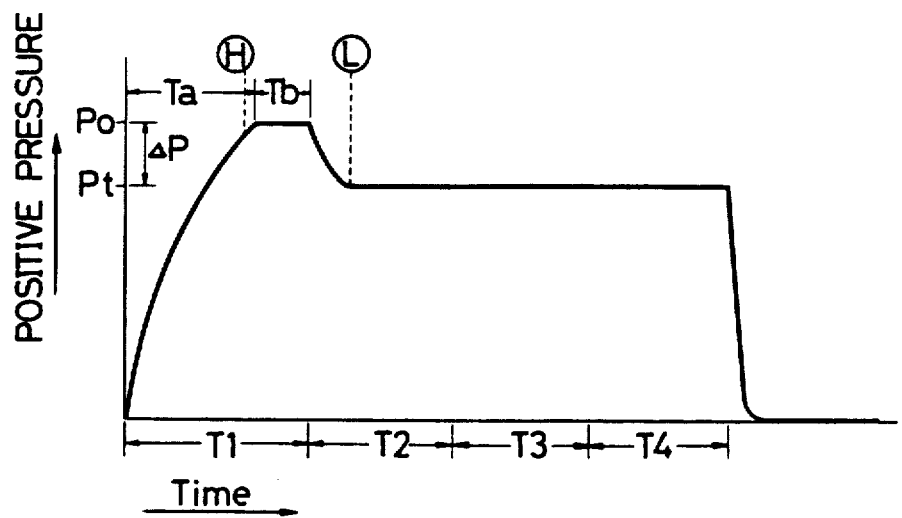

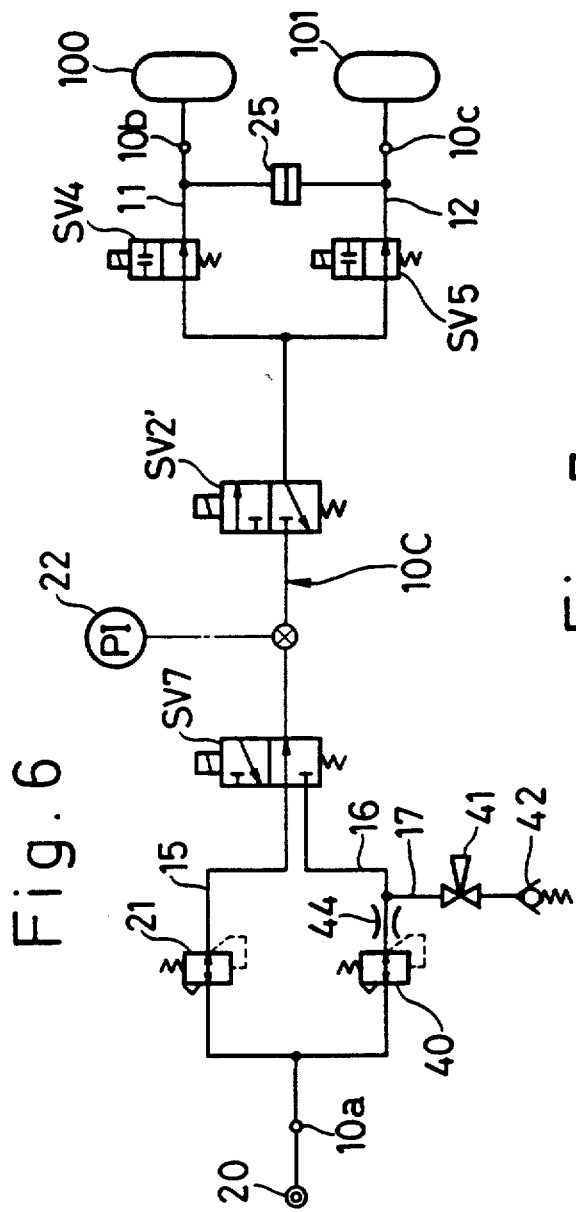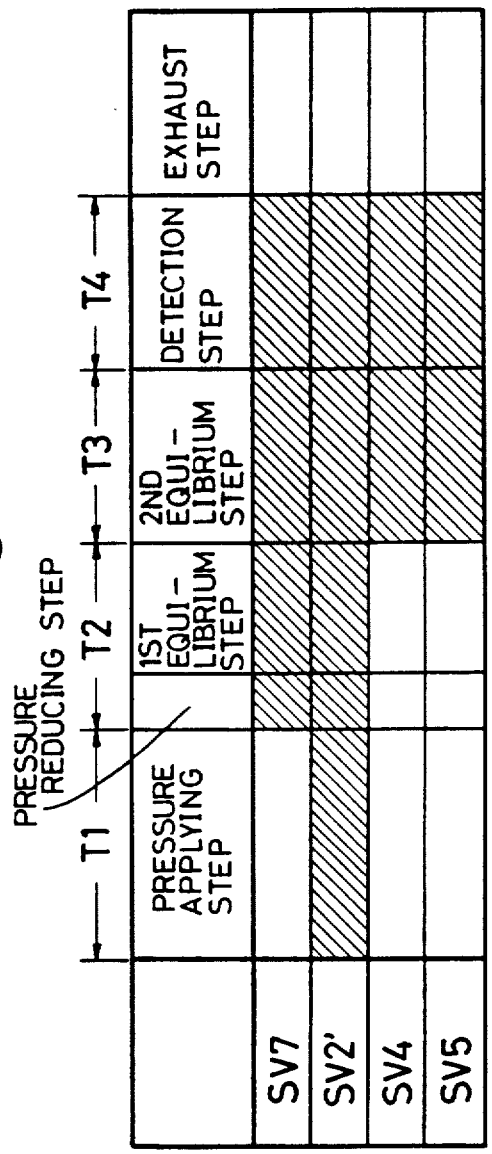

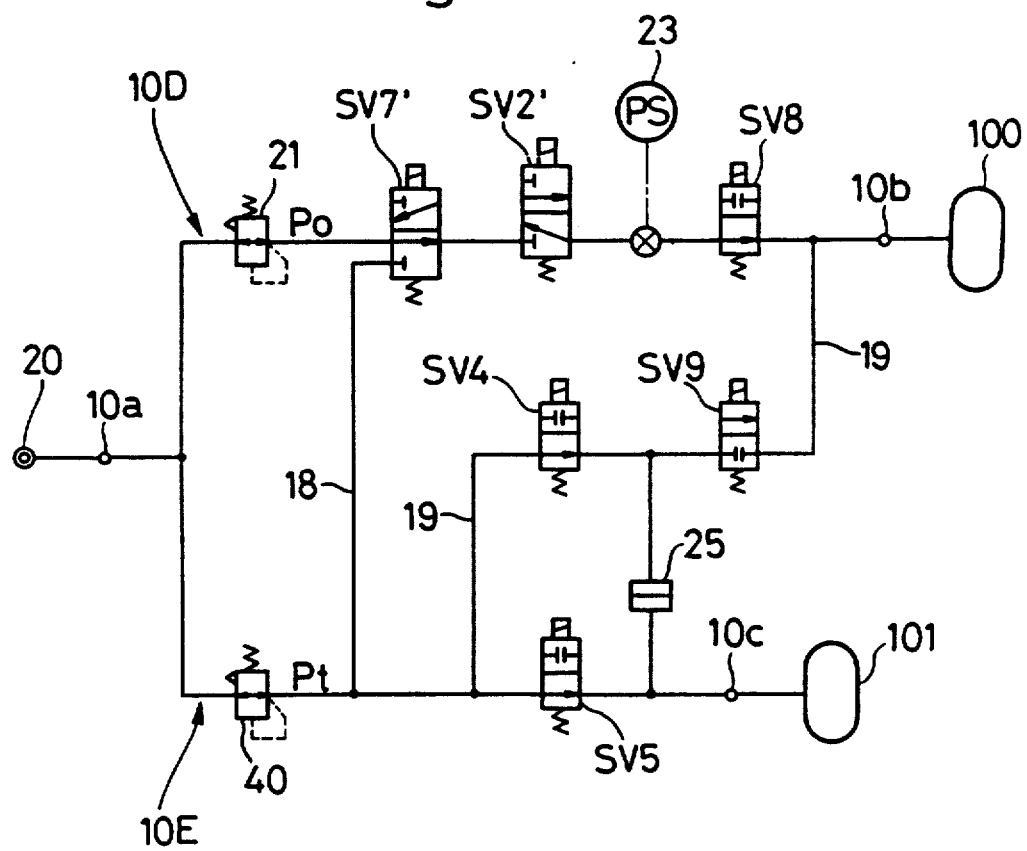

1

LEAKAGE TEST METHOD AND APPARATUS

BACKGROUND OF THE INVENTION

1. Field of the Invention

This invention relates to a leakage test method and apparatus for determining, using air or other gas, whether there is any flaw in a hollow object such as a 2. Prior Art Conventional air leakage test methods are generally classified into the simplified type and the pressure differential-detecting type.

A leakage test method of the simplified type as shown in FIG. 1 of Japanese Laid-Open (Kokai) Patent Application No. 49774/76 is performed using a leakage test apparatus including an air passage having a pressure input terminal and a pressure output terminal, the pressure input terminal being connected to a pressure source. A regulator, a three-port exhaust valve, and an on-off valve are provided on the air passage in this order from the upstream side to downstream side of the air passage, and a pressure sensor is connected to the air passage at a position downstream of the on-off valve.

In the above leakage test method of the simplified type, the on-off valve is set in an open condition, and the exhaust valve is set in such a manner that the pressure output terminal is disconnected from the regulator and communicates with the ambient atmosphere. In this condition, a hollow object to be tested (hereinafter often referred to as "object") is connected to the pressure output terminal. Then, the exhaust valve is switched to connect the object to the regulator. As a result, the pressure of the pressure source is reduced by the regulator, and this reduced pressure is applied to the object as a test pressure. Then, the on-off valve is closed to disconnect the object from the regulator, and in this condition, the pressure sensor determines whether any leakage develops in the object, that is, whether the pressure within the object is lower than the test pressure.

In the above leakage test method of the simplified type, when the test pressure is introduced into the object, the temperature of the air in the object becomes higher than the ambient temperature because of the compression of the air. Therefore, when the object is disconnected from the pressure source immediately after the test pressure is introduced into the object, the temperature within the object drops because of heat radiation from the object. As a result, even when there is no air leakage in the object, the air pressure within the object gradually drops. This pressure drop stops when the temperature of the air within the object becomes equal to the ambient temperature.

In the above method, the leakage detection can not be carried out a short period of time after the test pressure is introduced into the object. The reason is that the air pressure drop within the object due to the above-mentioned heat radiation can not clearly be distinguished from the air pressure drop due to an air leakage developing in the object. Thus, it is difficult to clearly judge whether there is any leakage in the object.

Therefore, practically, the communication of the object with the regulator is maintained until the temperature within the object becomes equal to the ambient temperature, thereby maintaining the pressure within the object at the test pressure. Then, the on-off valve is closed, and the leakage detection is carried out. With this method, however, since the leakage detection must wait until the temperature within the object becomes equal to the ambient temperature, the time required for one cycle of the leakage test is long, and therefore this leakage test can not be carried out efficiently.

In an apparatus for performing an air leakage test method of the pressure differential-detecting type, as disclosed in Japanese Laid-Open Utility Model Application Nos. 66486/74 and 99686/79, an air passage has two branch passages at the downstream side, and the distal ends of the two branch passages serve as pressure output terminals, respectively. A regulator and an exhaust valve are provided on the air passage in this order from the upstream side, and on-off valves are provided on the two branch passages, respectively. Each of two pressure inlet ports of a pressure sensor is connected to a respective one of the two branch passages at a position downstream of the on-off valve. The exhaust valves and the on-off valves perform the same functions as those described above for the leakage test method of the simplified type. An object to be test and a reference container confirmed to be free from leakage are connected to the two pressure output terminals, respectively. A test pressure is applied to both the object and the reference container. The pressure sensor detects a pressure differential between the pressure within the object and the pressure within the reference container. More specifically, when the object is not subjected to pressure leakage, the pressures inputted respectively into the pressure inlet ports of the pressure sensor are equal, and therefore an output voltage of the pressure sensor is substantially zero. When there is a pressure leakage in the object, the pressure within the object is lower than the pressure within the reference container, and therefore the pressure sensor feeds an output voltage representative of such a pressure difference.

With the above air leakage test method of the pressure differential-detecting type, the leakage can be detected with a high sensitivity. In addition, when the object and the reference container have the same volume and the same shape, the airs within the object and the reference containers are subjected to the same pressure drop due to a heat radiation. Therefore, it is not necessary for the leakage detection to wait until the temperature of the air within the object and the reference container becomes equal to the ambient temperature. Actually, however, in many cases, the reference container is different in volume and shape from the object. In such a case, the reference container is different in heat radiation from the object, and hence different in pressure drop due to such heat radiation. Therefore, when the object and the reference container in their sealed condition radiate heat, there occurs a difference in pressure between the two. Therefore, the leakage detection must wait until the temperature of the air within each of the object and the reference container becomes equal to the ambient temperature. Thus, with this conventional method, the leakage test can not be carried out in an efficient manner.

The prior art related to the present invention is disclosed in Japanese Laid-Open Patent Application Nos. 60586/74, 53095/74 and 48385/76. Particularly, Japanese Laid-Open Patent Application No. 60978/74 and FIG. 2 of Japanese Laid-Open Patent Application No. 49774/76 disclose the technique of stabilizing the pressure, but a pressure relieving means is not disclosed.

SUMMARY OF THE INVENTION

It is therefore an object of this invention to provide a method and apparatus for accurately carrying out a leakage test in a short time.

According to a first aspect of the invention, there is provided a leakage test method of detecting a leakage in a hollow object comprising the steps of:

(a) connecting an initial pressure-generating means to the object to supply an initial pressure into the object;

(b) subsequently disconnecting the initial pressure-generating means from the object, and relieving part of the initial pressure within the object to bring the pressure within the object to a test pressure; and (c) subsequently sealing the object, and detecting a variation in the pressure within the object to determine whether there is any leakage in the object.

According to a second aspect of the invention, there is provided a leakage test apparatus for detecting a leakage in a hollow object, comprising:

(a) means for generating an initial pressure;

(b) passage means for connecting the initial pressure-generating means to the object;

(c) communication-controlling means provided on the passage means and capable of being switched from a first condition in which the communication-controlling means interrupts the communication between the initial pressure-generating means and the object to a second condition in which the communication-controlling means communicates the initial pressure-generating means with the object so as to supply the initial pressure into the object from the initial pressure-generating means via the passage means;

(d) pressure relieving means for relieving part of the pressure within the object when the communication-controlling means is in its first condition, thereby bringing the pressure within the object to a test pressure; and (e) pressure detection means for detecting a variation in the test pressure within the object when the communication-controlling means is in its first condition, so as to determine whether there is any leakage in the object.

According to a third aspect of the invention, there is provided a leakage test apparatus for detecting a leakage in a hollow object, comprising:

(a) means for generating an initial pressure;

(b) means for generating a test pressure;

(c) first passage means for connecting the initial pressure generating means to the object;

(d) second passage means for connecting the test pressure generating means to a reference container to supply the test pressure into the reference container from the test pressure generating means;

(e) communication-controlling means provided on the first passage means so as to selectively open and close the first passage means, the initial pressure being supplied into the object from the initial pressure generating means when the communication-controlling means opens the first passage means;

(f) pressure relieving means connected to the first passage means, the pressure relieving means relieving part of the pressure within the object when the communication-controlling means closes the first passage means, thereby bringing the pressure within the object to the test pressure;

(g) pressure detection means for detecting a difference between the pressure within the object and the pressure within the reference container when the communication-controlling means closes the first passage means; and (f) communication means provided on the first passage means so as to communicate the object to an ambient atmosphere after the pressure difference is detected.

BRIEF DESCRIPTION OF THE INVENTION

FIG. 2 is a time chart showing the operations of solenoid valves used in the apparatus of FIG. 1 during the leakage test;

FIG. 3 is a graph showing a pressure change of an object to be tested which is not subjected to any leakage;

FIG. 6 is a view similar to FIG. 1 but showing a third preferred embodiment of the invention;

FIG. 7 is a time chart similar to FIG. 2 but showing the operations of solenoid valves of the apparatus of FIG. 6;

FIG. 8 is a view similar to FIG. 1 but showing a fourth preferred embodiment of the invention;

FIG. 9 is a time chart similar to FIG. 2 but showing the operations of solenoid valves of the apparatus of FIG. 8;

DESCRIPTION OF THE PREFERRED EMBODIMENTS OF THE INVENTION

A first preferred embodiment of a leakage test apparatus of the present invention will now be described with reference to FIGS. 1 to 3.

Figure 1:
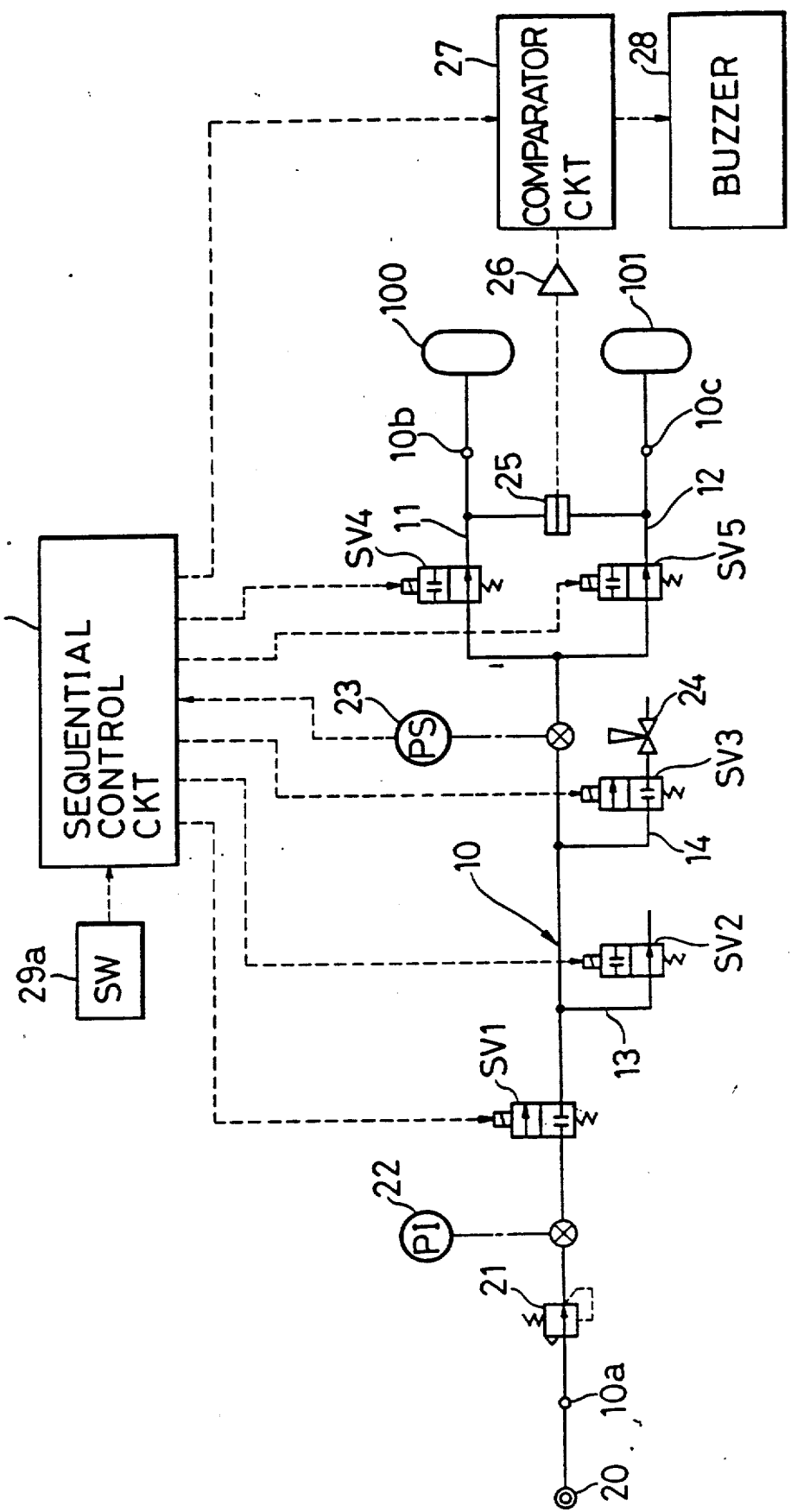
FIG. 1 is a schematic view of a first preferred embodiment of a leakage test apparatus of the invention.

The leakage test apparatus of the pressure differential-detecting type shown in FIG. 1 has an air passage 10 defined by holes, formed in blocks, and/or pipes. The air passage 10 has a pressure input terminal 10a at its upstream side, and has two branch passage 11 and 12 at its downstream side. The distal ends of the branch passages 11 and 12 serve as pressure output terminals 10b and 10c, respectively. The pressure input terminal 10a is connected to a source 20 of pressurized air.

A regulator 21 comprising a pressure reducing valve having a relief valve, a pressure gauge 22, a two-port solenoid valve SV1 of the normally closed type and a pressure switch 23 are provided on the air passage 10 in this order from the upstream side toward the downstream side. Auxiliary passages 13 and 14 are connected at their one ends to that portion of the air passage 10 extending between the solenoid valve SV1 and the pressure switch 23, the other ends of the passages 13 and 14 opening to the atmosphere. A two-port solenoid valve SV2 of the normally open type for exhaust purposes is provided on the auxiliary passage 13. A two-port solenoid valve SV3 of the normally closed type, serving as a pressure relieving means, and a throttle valve 24 for regulating the flow rate are provided on the auxiliary passage 14.

Two-port solenoid valves SV4 and SV5 of the normally open type each serving as a communication-controlling means are provided on the branch passages 11 and 12, respectively. A pressure sensor 25 is connected to the branch passages 11 and 13 at a position downstream of the solenoid valves SV4 and SV5. The pressure sensor 25 is of the conventional type and therefore will not be described here in detail. Briefly, the pressure sensor 25 comprises a housing having two pressure inlet ports, and the internal space of the housing is divided by a diaphragm (not shown) into two chambers. The two pressure inlet ports communicate with these two chambers, respectively. One of the pressure inlet ports is connected to the branch passage 11 while the other pressure inlet port is connected to the branch passage 12. A deformation of the diaphragm caused by a pressure differential between the two chambers is electromagnetically detected by a detecting coil mounted within the housing. The output of the pressure sensor 25 is amplified by an amplifier 26 and is fed to a comparator circuit 27. The comparator circuit 27 outputs a leakage detection signal when the thus amplified output exceeds a threshold value, thereby operating a buzzer 28 and/or a lamp.

The solenoid valves SV1 to SV5 are controlled by a sequential control circuit 29. The sequential control circuit 29 also feeds a threshold value-switching instruction to the comparator circuit 27. The pressure switch 23 has a first contact and a second contact, and "ON" signals of these contacts are sent to the sequential control circuit 29.

A leakage test method to be performed using the above leakage test apparatus will now be described in detail.

As shown in FIG. 1, when the solenoid valves SV1 to SV5 are in their inoperative or deactivated (OFF) condition (that is, the solenoid valves SV1 and SV3 are closed whereas the solenoid valves SV2, SV4 and SV5 are open), a hollow object 100 to be tested, such as a container, is connected to the pressure output terminal 10b of the air passage 10, and a reference container 101 which has been confirmed to be free from leakage is connected to the other pressure output terminal 10c of the air passage 10. In this embodiment, the reference container 101 may be different in volume and shape from the object 100.

Then, a start switch 29a is turned on to start the operation of the sequential control circuit 29. The subsequent operation will be described with reference to FIG. 2 showing a time chart and FIG. 3 showing a graph representing a pressure variation. In FIG. 2, those blocks or portions marked by oblique lines represent activated (ON) conditions of the solenoid valves.

One cycle of the leakage test consists of a pressure applying step (initial pressure supplying step), a pressure reducing step (pressure relieving step), a first equilibrium step, a second equilibrium step, a detection step and an exhaust step. A time period T1 of the pressure applying step, a time period T2 of a combination of the pressure reducing step and the first equilibrium step, a time period T3 of the second equilibrium step, and a time period T4 of the detection step are set by timers of the sequential control circuit 29.

In the pressure applying step, the solenoid valves SV1 and SV2 are activated whereas the other solenoid valves SV3 to SV5 remains deactivated. Therefore, the solenoid valves SV1, SV4 and SV5 are in their open condition, and the solenoid valves SV2 and SV3 are in their closed condition. As a result, the pressurized air flowing from the pressurized air source 20 through the air passage 10 is reduced by the regulator 21 to an initial pressure Po and then is applied to the object 100 and the reference container 101, so that the pressures within the object 100 and the reference container 101 increase to the initial pressure Po. The time period between the above start of the operation and the time when the pressure within the object 100 and the reference container 101 reaches the initial pressure Po is indicated by Ta in FIG. 3. During the remaining time period Tb of the pressure applying step, the pressure within the object 100 and the reference container 101 is maintained at the initial pressure Po. The initial pressure Po is higher than a test pressure Pt later described.

The first contact of the pressure switch 23 is turned on by a pressure which is higher than the test pressure Pt and is slightly lower than the initial pressure Po. If this first contact should not be turned on, the sequential control circuit 29 does not perform the following pressure reducing step.

Upon lapse of the time period T1 from the above start, the operation proceeds from the pressure applying step to the pressure reducing step. More specifically, the solenoid valve SV1 is deactivated to interrupt the communication of the regulator 21 with the object 100 and the reference container 101. At the same time, the solenoid valve SV3 is activated. As a result, part of the pressurized air within the object 100 and the reference container 101 is discharged to the ambient atmosphere through the solenoid valve SV3 and the throttle valve 24, so that the pressure within the object 100 and the reference container 101 decreases.

When the pressure within the object 100 and the reference container 101 drops to the test pressure Pt, the second contact of the pressure switch 23 is turned on. The sequential control circuit 29 is responsive to this "ON" signal of the second contact to switch the solenoid valve SV3 into the deactivated condition to close the same, thereby finishing the pressure reducing step. Then, the operation proceeds to the first equilibrium step as later described.

As shown in FIG. 3, after the above pressure reducing step is finished, the pressure within the object 100 and the reference container 101 is stable. The reason for this will now be described in detail. The temperature of the air within the object 100 and the reference container 101 rises during the time period Ta between the start of the pressure applying operation and the time when the pressure within the object 100 and the reference container 101 reaches the initial pressure Po, and that temperature slightly drops during the time period Tb when the pressure within the object 100 and the reference container 101 is maintained at the initial pressure Po. However, this time period Tb is so short that the above temperature will not drop to a temperature equal to the ambient temperature. In the subsequent pressure reducing step, the pressurized air is discharged, and the temperature of the air within the object 100 and the reference container 101 is decreased by this discharging to a temperature equal to the ambient temperature. Therefore, after this pressure reducing step, since the object 100 and the reference container 101 do not spontaneously radiate heat, the pressure within the object 100 and the reference container 101 will not be decreased by such spontaneous heat radiation and hence becomes stable.

As described above, the temperature within the object 100 and the reference container 101 is forcibly decreased to the ambient temperature by the pressure reduction before a spontaneous heat radiation of the object 100 and the reference container 101 occurs, and therefore the pressure within the object 100 and the reference container 101 is reduced to the stable test pressure Pt in a short time.

In the above embodiment, in order to stabilize the pressure of the air within the object 100 and the reference container 101 immediately after the above pressure reducing step, a pressure differential ΔP between the initial pressure Po and the test pressure Pt as well as the time period Tb of maintaining the initial pressure Po must be so determined that the temperature within the object 100 and the reference container 101 becomes equal to the ambient temperature by the pressure reduction.

The greater the pressure differential ΔP is, the more the temperature within the object 100 and the reference container 101 drops. The longer the pressure-maintaining time period Tb is, the more the temperature of the air within the object 100 and the reference container 101 drops during the pressure-maintaining time period Tb. There is a correlation between the pressure differential ΔP and the pressure-maintaining time period Tb. More specifically, the pressure-maintaining time period Tb can be shortened by increasing the pressure differential ΔP. In contrast, if the pressure differential ΔP is small, then it is necessary to increase the pressure maintaining period Tb. Although It is preferred that the test time be shortened by providing the increased initial pressure Po to increase the pressure differential ΔP, these parameters Po and P are suitably determined in accordance with the strength of the object 100, etc.

The pressure differential ΔP and the pressure-maintaining time Tb may be slightly deviated from those values which make the temperature of the air within the object 100 and the reference container equal to the ambient temperature. In such a case, the first and second equilibrium steps subsequent to the pressure reducing step are made longer, thereby stabilizing the test pressure. Even in this case, the leakage test time can be shorter than that achieved with the conventional method.

In the first equilibrium step subsequent to the pressure reducing step, only the solenoid valves SV4 and SV5 are in the open condition, and that portion of the air passage 10 disposed downstream of the solenoid valve SV1, the object 100 and the reference container 101 are disconnected from the pressurized air source 20 and the ambient atmosphere. In this first equilibrium step, a small pressure fluctuation, caused by the switching of the solenoid valve SV3, is allowed to calm down, and also if there is a small difference between the temperature within the object 100 and the reference container 101 and the ambient temperature after the above pressure reducing step, a small pressure fluctuation caused by such a small temperature difference is allowed to clam down.

Upon lapse of the sum of the time periods T1 and T2 from the above start, the operation proceeds to the second equilibrium step. More specifically, the solenoid valves SV4 and SV5 are activated into the closed condition. As a result, the object 100 and the reference container 101 are disconnected from each other, and are disconnected from the pressurized air source 20 and the ambient atmosphere. In this second equilibrium step, a small pressure fluctuation, developing within the object 100 and the reference container 101 as a result of the switching of the solenoid valves SV4 and SV5, is allowed to clam down. In this second equilibrium step, if there is a great leakage in the object 100, the pressure within the object 100 is greatly decreased, so that there occurs a great pressure differential between the object 100 and the reference container 101. As a result, the pressure sensor 25 outputs a high voltage. On the other hand, the comparator circuit 27 is set to a high threshold value, and when the output voltage of the pressure sensor 25 exceeds this threshold value, the buzzer 28 is operated. A small leakage of the object 100 is not detected in the second equilibrium step.

Then, the operation proceeds from the second equilibrium step to the detection step. More specifically, in accordance with an instruction of the sequential control circuit 29, the comparator circuit 27 is set to a low threshold value so as to provide a higher detection sensitivity. During the time period T4, it is monitored whether the output voltage of the pressure sensor 25 representative of the pressure differential between the object 100 and the reference container 101 exceeds the threshold valve of the comparator circuit 27 or not. If the output voltage exceeds the threshold value, then the buzzer 28 is operated to produce an alarm sound. In contrast, if the output voltage does not exceeds the threshold value, the buzzer 28 is not operating, thus confirming that the object 100 has a complete sealing ability.

Then, after the above detection step, the operation proceeds to the exhaust step. In this exhaust step, the solenoid valves SV2, SV4 and SV5 are deactivated so that they are returned to their respective conditions shown in FIG. 1. As a result, the air within the object 100 and the reference container 101 is discharged to the ambient atmosphere through the solenoid valve SV2.

Thus, one cycle of the leakage test is completed, and the time required for one cycle of this leakage test can be reduced to about one-third of the time of the conventional leakage test method.

In the above leakage test method of the pressure differential-detecting type, the pressure within the reference container 101 is reduced simultaneously with the reduction of the pressure within the object 100, so that the temperature within the reference container 101 becomes equal to the ambient temperature, thereby reducing or eliminating the pressure fluctuation due to the heat radiation. Therefore, the reference container 101 can be different in volume and shape from the object 100. If necessary, the use of the reference container 101 can be omitted, in which case the pressure output terminal 10c is closed so that portion of the branch portion 12 extending between the pressure output terminal 10c and the solenoid valve SV5 can perform the function of the reference container.

The other preferred embodiments of the invention will be described below. In the illustrated embodiments, corresponding parts are denoted by the same reference numerals and characters, respectively, and detailed descriptions thereof will not be repeated. Also, since the electrical circuitry including the sequential control circuit 29 is the same or similar in the all the embodiments, it is not shown with respect to the other embodiments.

Figure 4:
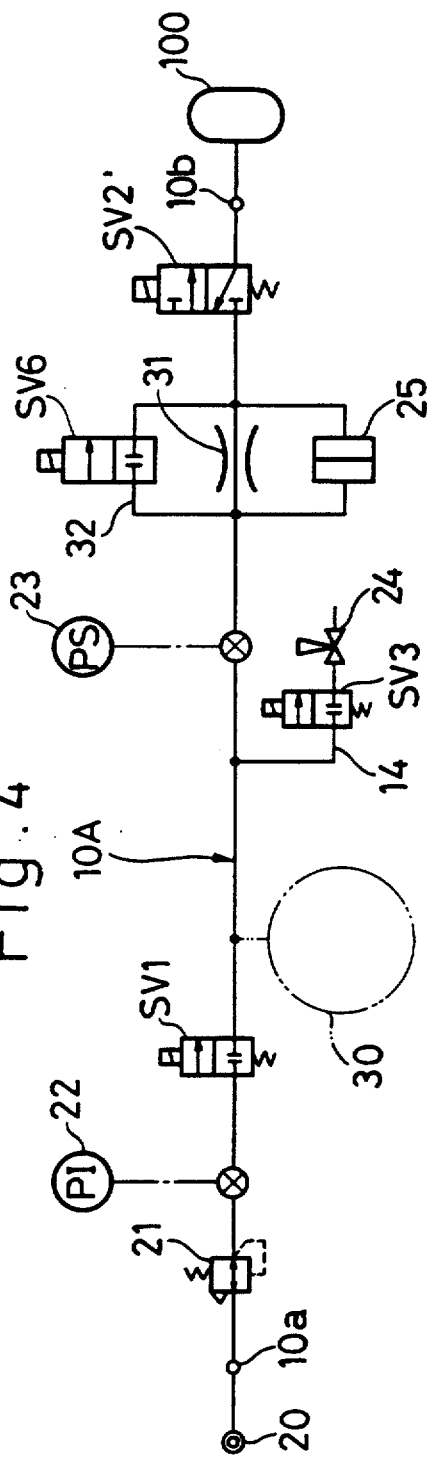
FIG. 4 is a view similar to FIG. 1 but showing a second preferred embodiment of the invention.
Figure 5:
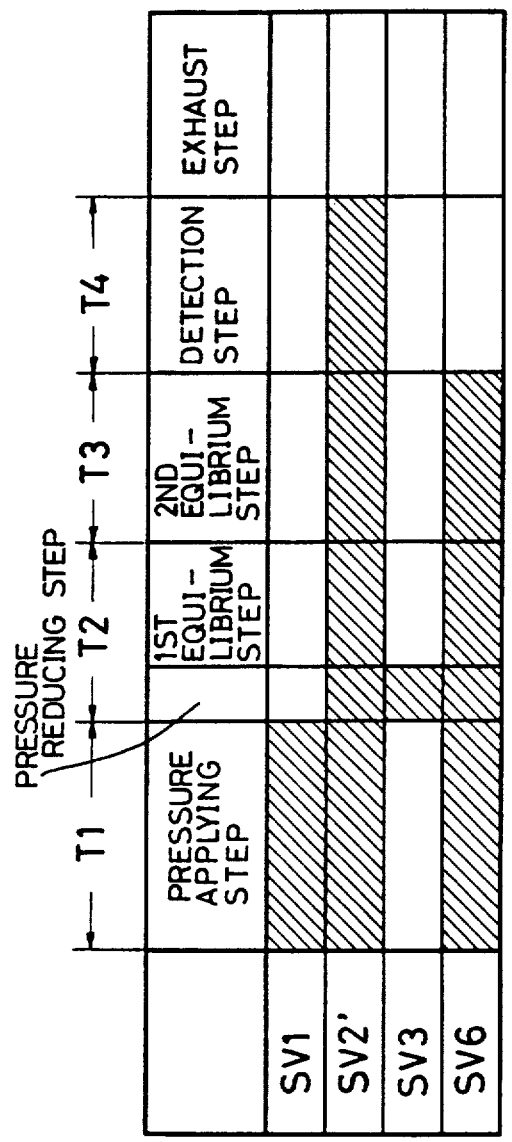
FIG. 5 is a time chart similar to FIG. 2 but showing the operations of solenoid valves of the apparatus of FIG. 4.

FIG. 4 shows a second preferred embodiment of a leakage test apparatus of the invention, and those parts thereof which differ from the leakage test apparatus of FIG. 1 will now be described. In the second embodiment, the downstream side of an air passage 10A is not branched. An orifice 31 and a three-port solenoid valve SV2' for exhaust purposes are provided on that portion of the air passage 10A extending between a pressure switch 23 and a pressure output terminal 10b, the orifice 31 being disposed upstream of the solenoid valve SV2'. As shown in FIG. 5, the solenoid valve SV2' is in a deactivated condition in the exhaust step, so that the object 100 is disconnected from that portion of the air passage 10A disposed upstream of the solenoid valve SV2' and communicates with the ambient atmosphere. In the other steps of the operation, the solenoid valve SV2' causes the object 100 to communicate with that portion of the air passage 10A disposed upstream of the solenoid valve SV2'. A bypass passage 32 is connected to the opposite sides of the orifice 31, and a two-port solenoid valve SV6 of the normally closed type is provided on the bypass passage 32. A pressure differential between the opposite sides of the orifice 31 is detected by a pressure sensor 25.

In the second embodiment, in the pressure applying step, the pressure reducing step, and the first and second equilibrium steps, the solenoid valve SV6 is activated so that the object 100 is connected via the bypass passage 32 to that portion of the air passage 10A extending between a regulator 21 and the orifice 31. In the detection step and the exhaust step, the solenoid valve SV6 is deactivated to block the bypass passage 32. In the detection step, when the object 100 has no flaw or the like, so that there is no leakage of the pressurized air, the air does not flow into the orifice 31, and therefore no pressure differential develops between the opposite sides of the orifice 31, so that the output voltage of the pressure sensor 25 is zero. When there is a leakage in the object 100, the air in that portion of the air passage 10A disposed upstream of the orifice 31 flows through the orifice 31 toward that portion of the air passage 10A disposed downstream of the orifice 31, so that a pressure loss develops in the orifice 31. As a result, the pressure sensor 25 outputs a voltage corresponding to this pressure loss In the second embodiment, an air tank 30, shown in phantom in FIG. 4, may be connected to that portion of the air passage 10A extending between the solenoid valve SV1 and the auxiliary passage 14. In this case, the flow rate of the orifice 31 can be increased so as to increase the above pressure loss, so that the leakage detection can be carried out with a higher sensitivity.

FIG. 6 shows a third preferred embodiment of a leakage test apparatus of the invention. Like the apparatus of FIG. 1, the apparatus of this embodiment is of the pressure differential-detecting type. In this third embodiment, an air passage 10C further has two branch passages 15 and 16 at its upstream side. A regulator 21 of which set pressure is the initial pressure Po as described above for the first embodiment is provided on one branch passage 15. A regulator 40 is provided on the other branch passage 16, the regulator 40 comprising a pressure reducing valve having a relief valve of which set pressure is the test pressure Pt. An orifice 44 is provided on the branch passage 16 at a position downstream of the regulator 40, and an auxiliary passage 17 is connected at one end to the branch passage 16 at a position downstream of the orifice 44. A throttle valve 41 is provided on the auxiliary passage 17, and the other end of the auxiliary passage 17 is open to the ambient atmosphere via a relief valve 42. The relief valve 42 has such a set pressure that it opens when a pressure lower than the initial pressure Po and slightly higher than the test pressure Pt is applied thereto.

The downstream sides of the branch passages 15 and 16 are connected to an intermediate portion of the air passage 10C via a three-port solenoid valve SV7. The solenoid valve SV7, when in a deactivated condition, connects the intermediate portion of the air passage 10C to the branch passage 15 and disconnects this intermediate portion from the other branch passage 16. In the activated condition of the solenoid valve SV7, this connection is reversed.

A pressure gauge 22 and a solenoid valve SV2' for exhaust purposes are provided on the intermediate portion of the air passage 10C. The operation of this solenoid valve SV2' is similar to that of the solenoid valve SV2' of FIG. 4 (the second embodiment). More specifically, the solenoid valve SV2' is deactivated only in the exhaust step so that it causes the object 100 and the reference container 101 to communicate with the ambient atmosphere and interrupts the communication of the object 100 and the reference container 101 with that portion of the air passage 10C disposed upstream of the solenoid valve SV2'.

In the apparatus of this embodiment, when all the solenoid valves are in their deactivated condition as shown in FIG. 6, the object 100 and the reference container 101 are connected to the pressure output terminals 10b and 10c, respectively. Then, a sequential control circuit (not shown) is started to conduct the following leakage test.

In the pressure applying step, as shown in FIG. 7, the solenoid valve SV2' is switched to the activated condition. As a result, the regulator 21 communicates with the object 100 and the reference container 101, and the pressure within the object 100 and the reference container 101 reaches to the initial pressure Po before a time period T1 elapses from the above start of the operation. Thereafter, the pressure within the object 100 and the reference container 101 is maintained at the initial pressure Po until the end of the time period T1. In this pressure applying step, the pressure in that portion of the branch passage 16 disposed downstream of the regulator 40 is maintained at the test pressure Pt, and the relief valve of the regulator 40 and the relief valve 42 are in their closed condition.

In the subsequent pressure reducing step, the solenoid valve SV7 is activated, so that the object 100 and the reference container 101 communicate with the branch passage 16 and are disconnected from the regulator 21. Upon activation of the solenoid valve SV7, the pressure in that portion of the branch passage 16 disposed downstream of the regulator 40 rises to the initial pressure Po, so that the relief valve 42 opens. As a result, the pressure within the object 100 and the reference container 101 is reduced. Also, the relief valve of the regulator 40 is opened, and the pressurized air is discharged from the regulator 40. In this case, since the flow rate of the throttle valve 41 is greater than the flow rate of the orifice 44, the pressurized air is exhausted through the relief valve 42 in a greater proportion. The throttle valve 41 and the orifice 44 prevent the relief valve 42 and the relief valve of the regulator 40 from undergoing abrupt pressure variations, thereby achieving a stable pressure relieving of the pressurized air. When the pressure downstream of the regulator 40 is reduced to the set pressure of the relief valve 42, the relief valve 42 is closed, and thereafter the pressurized air is discharged or exhausted only by the relief valve of the regulator 40. Then, when this pressure further drops to the set pressure of the regulator 40 (i.e,, the test pressure Pt), the relief valve of the regulator 40 is also closed, so that the pressure within the object 100 and the reference container 101 are also set at the test pressure Pt. Thereafter, all the solenoid valves are maintained at the same conditions as in the pressure reducing step, and the subsequent first equilibrium step is carried out. In this first equilibrium step, since the object 100 and the reference container 101 are connected to the pressurized air source via the regulator 40, the pressure within the object 100 and the reference container 101 can be maintained at the test pressure Pt in a stable manner. For example, when the pressure within the object 100 and the reference container 101 becomes slightly lower than the test pressure Pt, a main valve of the regulator 40 is opened to replenish the object 100 and the reference container 101 with the pressurized air from the pressurized air source 20, so that the pressure therewithin will soon become the test pressure Pt again. When the pressure within the object 100 and the reference container 101 becomes slightly higher than the test pressure Pt, the relief valve of the regulator 40 is slightly opened to relieve the pressure, so that the pressure will soon become the test pressure Pt again.

The second equilibrium step and the detection step are similar to those of the first embodiment of FIG. 1, and therefore an explanation thereof is omitted. In these steps, although the solenoid valve SV7 is maintained in the activated condition, this valve may be deactivated.

In the subsequent exhaust step, all the solenoid valves are deactivated, and the pressurized air within the object 100 and the reference container 101 is discharged from the solenoid valve SV2'.

FIG. 8 shows a fourth preferred embodiment of a leakage test apparatus of the invention. This apparatus comprises two branched air passages 10D and 10E. The air passages 10D and 10E have a common pressure input terminal 10a at the upstream side, and also have at their downstream sides respective pressure output terminals 10b and 10c which are connectable respectively to the object 100 and the reference container 101.

A regulator 40 whose set pressure is the test pressure Pt and a two-port solenoid valve SV5 of the normally open type are provided on the air passage 10E, the regulator 40 being disposed upstream of the solenoid valve SV5.

A regulator 21 for converting the pressurized air to the initial pressure Po, a three-port solenoid valve SV7', a three-port solenoid valve SV2' for exhaust purposes, a pressure switch 23 and a two-port solenoid valve SV8 of the normally open type are provided on the air passage 10D in this order from the upstream side toward the downstream side. The solenoid valve SV7', when in its deactivated condition, communicates that portion of the air passage 10D disposed downstream of the solenoid valve SV7' with the regulator 21. The solenoid valve SV7', when in its activated condition, communicates said that portion of the air passage 10D with the regulator 40 on the air passage 10E via an auxiliary passage 18.

That portion of the air passage 10D disposed downstream of the solenoid valve SV8 is connected via an auxiliary passage 19 to that portion of the air passage 10E disposed downstream of the regulator 40. A two-port solenoid valve SV9 of the normally closed type and a two-port solenoid valve SV4 of the normally open type are provided on the auxiliary passage 19.

A difference between the pressure in that portion of the auxiliary passage 19 disposed downstream of the solenoid valve SV4 and the pressure in that portion of the air passage 10E disposed downstream of the solenoid valve SV5 (that is, a pressure differential between the object 100 and the reference container 101) is detected by a pressure sensor 25.

The following leakage test is carried out using the apparatus of this embodiment. In this embodiment, the reference container 101 is kept connected to the pressure output terminal 10c during many cycles of the leakage test for testing many objects 100. The pressurized air from a pressurized air source 20 is reduced by the regulator 40 to the test pressure Pt and is applied to the reference container 101. In this embodiment, as shown in FIG. 9, a time period T2a of the pressure reducing step as well as a time period T2b of the first equilibrium step is controlled by timers of a sequential control circuit (not shown).

When all the solenoid valves are in their deactivated condition as shown in FIG. 8, the object 100 is connected to the pressure output terminal 10b, and then the solenoid valve SV2' is activated to carry out the pressure applying step. More specifically, the pressurized air of the initial pressure Po is supplied from the regulator 21 into the object 100. In this pressure applying step, since the solenoid valve SV9 is closed, the pressure within the object 100 is maintained at the initial pressure Po.

Then, the solenoid valve SV7' is activated to carry out the pressure reducing step. More specifically, the object 100 is connected to the regulator 40, so that part of the pressurized air in the object 100 escapes through a relief valve of the regulator 40. As a result, the pressure within the object 100 is reduced to the test pressure Pt.

Then, the solenoid valves SV8 and SV9 are activated to carry out the first equilibrium step, so that the object 100 is connected to the regulator 40 not through the three-port solenoid valves SV2' and SV7' which are inevitably subjected to a small leakage but through the two-port solenoid valves SV9 and SV4 which are well sealed relative to the exterior. As a result, the pressure within the object 100 is accurately maintained at the test pressure Pt.

Then, the solenoid valves SV4 and SV5 are activated to carry out the second equilibrium step and the detection step as described above for the above embodiments.

Finally, all the solenoid valves are deactivated to carry out the exhaust step. At this time, although the pressurized air within the object 100 is discharged through the solenoid valves SV8 and SV2', the pressurized air within the reference container 101 is not discharged and is maintained at the test pressure Pt since the solenoid valve SV9 is closed.

Then, the object 100 which has been tested is removed from the pressure output terminal 10b while keeping the reference container 101 connected to the pressure output terminal 10c, and a fresh object 100 to be tested is connected to the pressure output terminal 10b. Then, the leakage test is repeated according to the above procedure.

In the fourth embodiment, the reference container 101 can be used continuously, and therefore the time and labor for exchanging the reference containers can be saved. The reason for this will now be described. In the conventional test method and also in the test methods of the above-mentioned 1st and 3rd embodiments, the pressurized air within the reference container 101 is discharged in the exhaust step (final step) of the leakage test. At this time, the temperature of the reference container 101 drops, and therefore can not used for the next leakage test. If such a reference container is used, there is, at the time of the start of the leakage test, a temperature difference between the object 100 having a temperature equal to the ambient temperature and the reference container 101 having a lowered temperature due to the exhaust of the pressurized air. As a result, in the detection step in which the reference container 101 is closed, a change in pressure develops in the reference container 101. For this reason, it is necessary that the reference container 101 should be replaced by another reference container having a temperature equal to the ambient temperature. On the other hand, in the fourth embodiment, the test pressure Pt is always applied to the reference container 101, and therefore the air within the reference container 101 is not subjected to a temperature change and always has a temperature equal to the ambient temperature. Therefore, even if the reference container 101 continues to be used, it is not subjected to a pressure change in the detection step.

Figure 10:
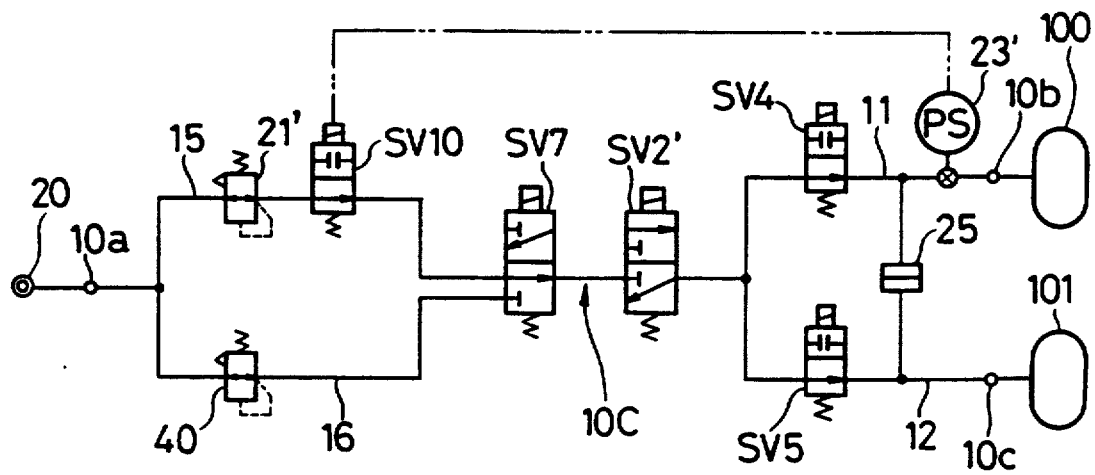
FIGS. 10 and 11 are views similar to FIG. 1 but showing fifth and sixth preferred embodiments, respectively.

FIG. 10 shows a fifth preferred embodiment of a leakage test apparatus of the invention. The basic construction of this apparatus is similar to that of the apparatus of FIG. 6 (the third embodiment). In the fifth embodiment, a pressure switch 23' is connected to a downstream-side branch passage 11 to which the object 100 is to be connected. A regulator 21' and a two-port solenoid valves SV10 of the normally open type are provided on an upstream-side branch passage 15. The set pressure of the regulator 21' is higher than the initial pressure Po. In the pressure applying step, when the pressure within the object 100 reaches the initial pressure Po, the pressure switch 23' is turned on, and in response to the turning-on of the pressure switch 23', the solenoid valve SV10 is activated into a closed condition. As a result, the pressure within the object 100 is maintained at the initial pressure Po.

In the fifth embodiment, the time required for increasing the pressure within the object 100 and the reference container 101 to the initial pressure Po in the pressure applying step can be shortened. The reason for this will now be described. In the case where the regulator whose set pressure is the initial pressure Po is used as in the above-mentioned 1st to 4th embodiments, the flow rate of the regulator is decreasing progressively as the pressure approaches the initial pressure Po. Therefore, it takes a relatively long time before the pressure within the object 100 reaches the initial pressure Po. On the other hand, in the fifth embodiment, the pressure within the object 100 is maintained at the initial pressure Po by closing the two-port solenoid valve SV10. Since the set pressure of the regulator 21' is higher than the initial pressure Po, the regulator 21' can secure a relatively large flow rate even when the pressure within the object 100 reaches the initial pressure Po. Thus, the regulator 21' will not prevent the pressure increase of the object 100. Therefore, the pressure within the object 100 can be increased to the initial pressure Po in a relatively short time.

The regulator 21' serves to prevent the object 100 from being subjected to an abrupt pressure increase when the pressurized air source 20 communicates with the object 100, and to positively increase the pressure within the object 100 to the initial pressure Po. If the pressure of the pressurized air source 20 is set in a suitable pressure range, the regulator 21' may be omitted.

Figure 11:
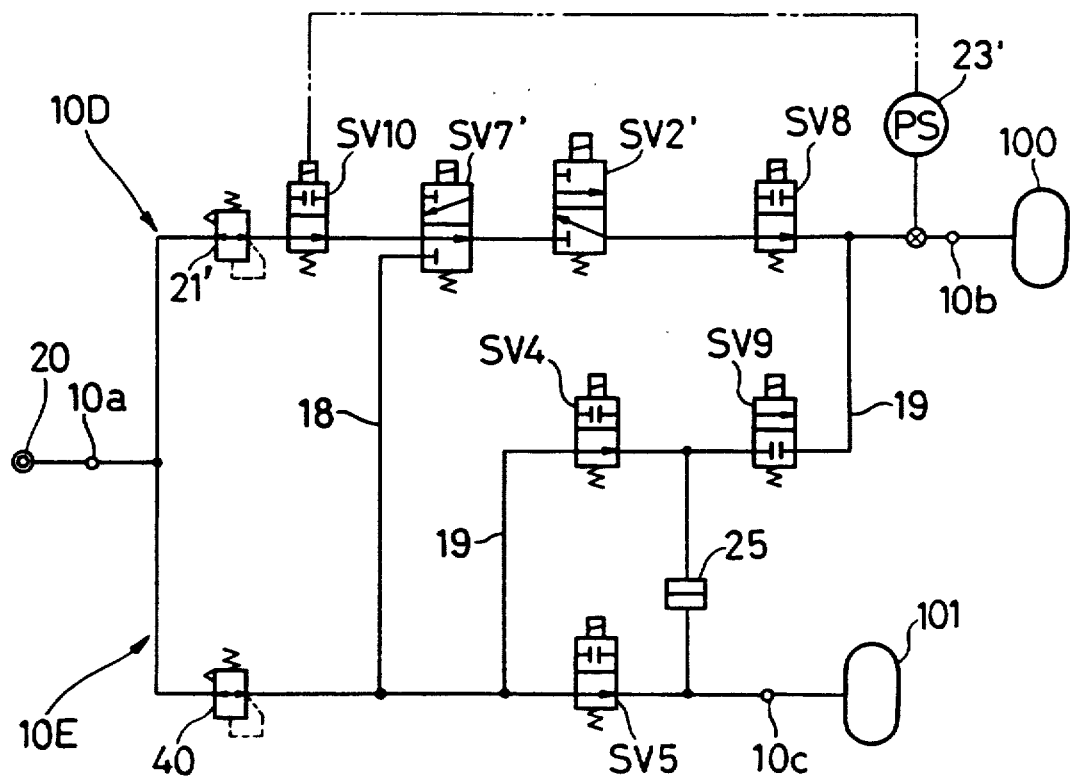

FIG. 11 shows a sixth preferred embodiment of a leakage test apparatus of the invention which differs from the apparatus of FIG. 8 (the fourth embodiment) in that the pressure switch 22' and solenoid valve SV10 of FIG. 10 are added and in that the set pressure of the regulator 21' is higher than the initial pressure Po. The functions of the pressure switch 22' and the solenoid valve SV10 are the same as those of the fifth embodiment, and therefore an explanation thereof is omitted.

Figure 12:
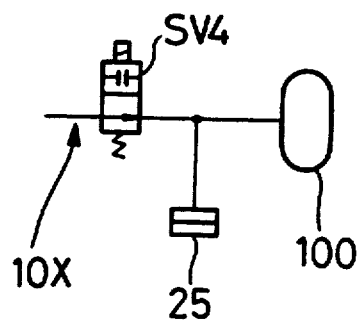
FIG. 12 is a fragmentary schematic view of an apparatus for carrying out a leakage test method of the simplified type.

As shown in FIG. 12, an air leak apparatus of the simplified type may be used. More specifically, the downstream side of an air passage 10X is not branched, and the reference container 101 is not used. There can be employed a pressure sensor 25 of the same type used in the leakage test apparatus of the pressure differential-detecting type. The pressure of the object 100 is applied to one pressure inlet port of the pressure sensor 25, and the other pressure inlet port is in communication with the ambient atmosphere. The construction of FIG. 12 can replace the downstream side of the apparatuses of FIGS. 1, 6 and 10.

Figure 13:
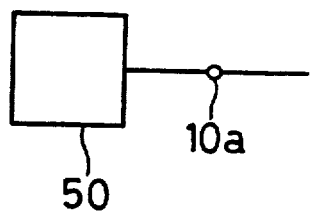
FIG. 13 is a schematic view showing a modified pressure source.

In all the embodiments mentioned above, the pressurized air source 20 can be replaced by a negative pressure source 50 (FIG. 13), such as a vacuum pump or a vacuum tank, connected to the pressure input terminal 10a of the air passage. In this case, in the pressure applying step (i.e., the initial step), the air within the object is drawn into the pressure source 50, so that the pressure within the object is lower than the atmospheric pressure. In this step, the temperature of the object becomes lower than the ambient temperature. In the pressure relieving step, the ambient air is introduced into the object, so that the temperature within the object rises and becomes substantially equal to the ambient temperature. Therefore, the air within the object is not subjected to a temperature fluctuation in the detection step, and hence a pressure fluctuation resulting from such temperature fluctuation will not develop in the object, thereby enabling an accurate leakage detection.

Figure 14:
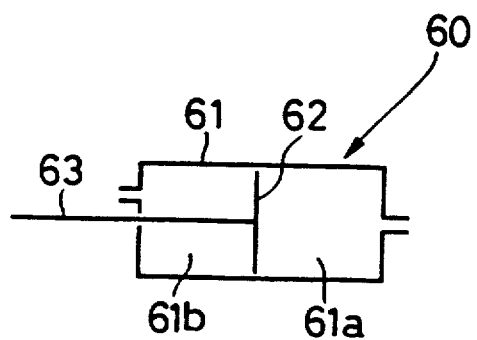
FIG. 14 is a schematic view showing a modified pressure relieving means.

Further, as shown in FIG. 14, an air cylinder 60 can be used as the pressure relieving means. The air cylinder 60 comprises a cylinder body 61, a piston 62 received within the cylinder body 61 for movement therealong, and a piston rod 63 connected at one end to the piston 62. The interior of the cylinder body 61 is divided by the piston 62 into two chambers 61a and 61b. The chamber 61a is in communication with the air passage, and the other chamber 61b opens to the ambient atmosphere. In the case where the pressurized air source is used, the piston rod 63 is pulled in the pressure relieving step to increase the volume of the chamber 61a of the cylinder body 61, thereby lowering the pressure in the air passage and the pressure within the object connected to this air passage in an amount corresponding to the increased amount of the volume of the chamber 61a. In the case of using the negative pressure source, the piston rod 63 is pushed in the pressure relieving step to reduce the volume of the chamber 61a.

While the leakage test apparatuses according to the present invention have been specifically shown and described herein, the invention itself is not to be restricted to the exact showing of the drawings and the description thereof, and various modifications can be made. For example, any other suitable gas other than the air, such as a nitrogen gas, can be used. Also, the sealed object may be accommodated within a sealed capsule connected to the end of the air passage.

What is claimed is:

1. A leakage test apparatus for detecting leakage in a hollow object, comprising:
    (a) means for generating an initial pressure;
    (b) passage means for connecting said initial pressure-generating means to the object;
    (c) communication-controlling means provided on said passage means and capable of being switched between a first condition and a second condition, wherein in said first condition said communication-controlling means interrupts communication between said initial pressure-generating means and the object, and in said second condition, said communication-controlling means communicates said initial pressure-generating means with the object so as to supply the initial pressure into the object from said initial pressure-generating means via said passage means;
    (d) pressure relieving means for relieving part of the initial pressure within the object when said communication-controlling means is in its first condition, thereby bringing the pressure within the object to a test pressure; and
    (e) pressure detection means for detecting a variation in the test pressure within the object when said communication-controlling means is in its first condition, so as to determine whether there is any leakage in the object;
    in which said initial pressure-generating means comprises a pressure source connected to said passage means and a solenoid on-off valve provided on said passage means, wherein a pressure switch is connected to said passage means between said solenoid valve and the object, said pressure switch detecting creation of the initial pressure within the object when the object is in communication with the pressure source to generate a detection signal, and said solenoid valve closing in response to said detection signal.

2. A leakage test apparatus for detecting leakage in a hollow object, comprising:
    (a) means for generating an initial pressure;
    (b) passage means for connecting said initial pressure-generating means to the object;
    (c) communication-controlling means provided on said passage means and capable of being switched between a first condition and a second condition, wherein in said first condition said communication-controlling means interrupts communication between said initial pressure-generating means and the object, and in said second condition, said communication-controlling means communicates said initial pressure-generating means with the object so as to supply the initial pressure into the object from said initial pressure-generating means via said passage means;
    (d) pressure relieving means for relieving part of the initial pressure within the object when said communication-controlling means is in its first condition, thereby bringing the pressure within the object to a test pressure; and
    (e) pressure detection means for detecting a variation in the test pressure within the object when said communication-controlling means is in its first condition, so as to determine whether there is any leakage in the object;
    in which said communication-controlling means comprises a first communication-controlling valve and a second communication-controlling valve which are provided on said passage means in this order from said initial pressure-generating means toward the object, said pressure relieving means being provided on that portion of said passage means disposed between said first and second communication-controlling valves, said pressure detection means being connected to that portion of said passage means disposed between said second communication-controlling valve and the object, the initial pressure being supplied into the object when said first and second communication-controlling valve s are opened, part of the pressure within the object being relieved by said pressure relieving means when said first communication-controlling valve is in its closed position with said second communication-controlling valve disposed in its open condition, and the variation in the pressure within the object being detected by the pressure detection means when said second communication-controlling valve is in its closed position.

3. Apparatus according to claim 2, in which said initial pressure-generating means comprises a pressure source connected to said passage means, and a pressure regulating valve provided on said passage means and disposed between said pressure source and the object, a set pressure of said pressure regulating valve being the initial pressure.

4. Apparatus according to claim 2, in which said passage means has first and second branch passages, the object and a reference container being connectable to said first and second branch passages, respectively, said second communication-controlling valve being provided on said first branch passage, a third communication-controlling valve being provided on said second branch passage, the opening and closing of said third communication-controlling valve being effected in synchronism with the opening and closing of said second communication-controlling valve, respectively, and said pressure detection means detecting a pressure differential between said first and second branch passages and hence a difference between the pressure within the object and the pressure within said reference container.

5. A leakage test apparatus for detecting a leakage in a hollow object, comprising:
    (a) means for generating an initial pressure;
    (b) passage means for connecting said initial pressure-generating means to the object;
    (c) communication-controlling means provided on said passage means and capable of being switched between a first condition and a second condition, wherein in said first condition said communication-controlling means interrupts the communication between said initial pressure-generating means and the object, and in said second condition said communication-controlling means communicates said initial pressure-generating means with the object so as to supply the initial pressure into the object from said initial pressure-generating means via said passage means;
    (d) pressure relieving means for relieving part of the initial pressure within the object when said communication-controlling means is in its first condition, thereby bringing the pressure within the object to a test pressure; and (e) pressure detection means for detecting a variation in the test pressure within the object when said communication-controlling means is in its first condition, so as to determine whether there is any leakage in the object, wherein said initial pressure-generating means comprises a pressure source, said passage means having two branch passages both connected to said pressure source, a pressure regulating valve whose set pressure is the test pressure being provided on one of said two branch passages, said pressure regulating valve serving as said pressure relieving means, said two branch passages being selectively connected to the object by a passage-selecting valve, said passage-selecting valve connecting the object to the other of said two branch passages when the initial pressure is supplied to the object, and said passage-selecting valve connecting the object to said one branch passage so as to relieve part of the pressure within the object through said pressure-regulating valve.

6. A leakage test apparatus for detecting a leakage in a hollow object, comprising:
  (a) means for generating an initial pressure;
  (b) means for generating a test pressure;
  (c) first passage means for connecting said initial pressure generating means to the object;
  (d) second passage means for connecting said test pressure generating means to a reference container to supply the test pressure into said reference container from said test pressure generating means;
  (e) communication-controlling means provided on said first passage means so as to selectively open and close said first passage means, the initial pressure being supplied into the object from said initial pressure generating means when said communication-controlling means opens said first passage means;
  (f) pressure relieving means connected to said first passage means, said pressure relieving means relieving part of the pressure within the object when said communication-controlling means closes said first passage means, thereby bringing the pressure within the object to the test pressure;
  (g) pressure detection means for detecting a difference between the pressure within the object and the pressure within the reference container when said communication-controlling means closes said first passage means; and
  (f) communication means provided on said first passage means so as to communicate the object to an ambient atmosphere after said pressure difference is detected.

7. Apparatus according to claim 6, in which said first and second passage means are connected to a common pressure source, said initial pressure generating means comprising said pressure source, said test pressure generating means comprising said pressure source and a pressure regulating valve provided on said second passage means, and a set pressure of said pressure regulating valve being the test pressure.

* * * * *